F. F. LEWANDOWSKI.
BAKING PAN.
APPLICATION FILED JULY 24, 1915.

1,238,030.

Patented Aug. 21, 1917.
2 SHEETS—SHEET 1.

Inventor.
Frank F. Lewandowski,
By Victor J. Evans
Attorney

Witnesses
Frederick W. Ely

F. F. LEWANDOWSKI.
BAKING PAN.
APPLICATION FILED JULY 24, 1915.
1,238,030.
Patented Aug. 21, 1917.
2 SHEETS—SHEET 2.
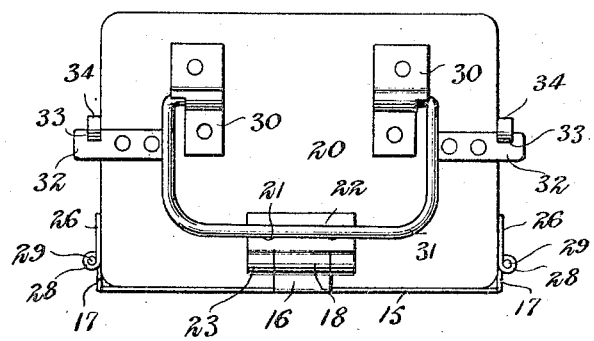
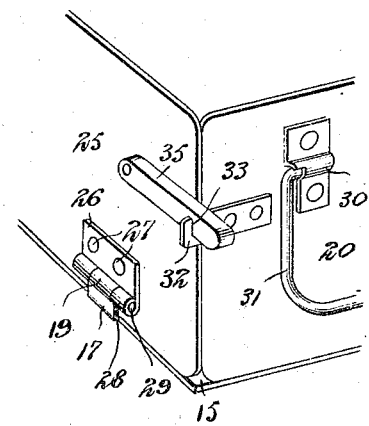
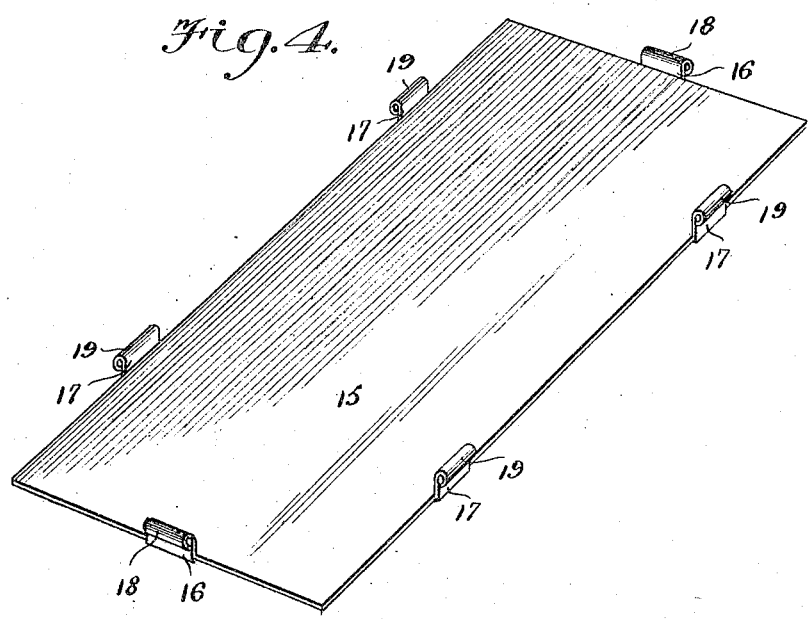
Witnesses
Frederick W. Ely
Wm Bagger
Inventor
Frank F. Lewandowski,
By Victor J. Evans
Attorney

UNITED STATES PATENT OFFICE.

FRANK F. LEWANDOWSKI, OF DETROIT, MICHIGAN.

BAKING-PAN.

1,238,030.　　　　　Specification of Letters Patent.　　Patented Aug. 21, 1917.

Application filed July 24, 1915.　Serial No. 41,722.

*To all whom it may concern:*

Be it known that I, FRANK F. LEWANDOWSKI, a citizen of the United States, residing at Detroit, in the county of Wayne and State of Michigan, have invented new and useful Improvements in Baking-Pans, of which the following is a specification.

This invention relates to baking pans, and it has for its object to provide a collapsible baking pan of simple and improved construction which may be readily folded in small compass when not in use.

A further object of the invention is to produce a collapsible baking pan of simple and improved construction in which the side and end walls may be readily moved or tilted to disengage them from the loaf that has been baked in the pan to facilitate the removal of such loaf without breaking or crumbling.

A further object of the invention is to simplify and improve the detailed construction and operation of the improved collapsible pan.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Fig. 2 is an end view of the same.

Fig. 4 is a perspective of the bottom member of the pan detached.

Fig. 6 is a perspective detail view of one corner of the pan.

Corresponding parts in the several figures are denoted by like characters of reference.

Figure 1:
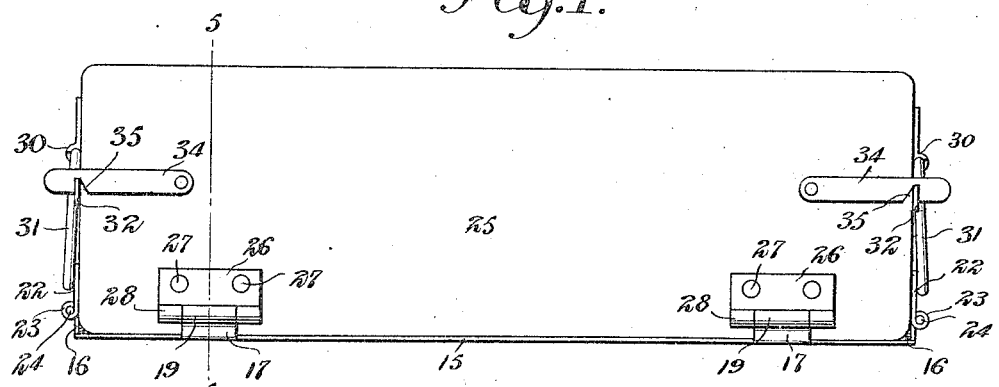
Figure 1 is a side view of a baking pan constructed in accordance with the invention.
Figure 3:
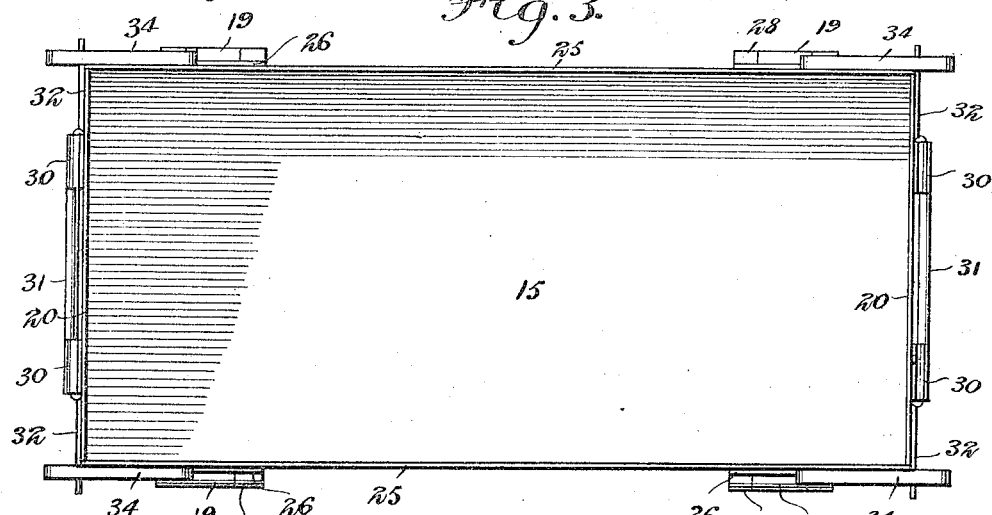
Fig. 3 is a top plan view.
Figure 5:
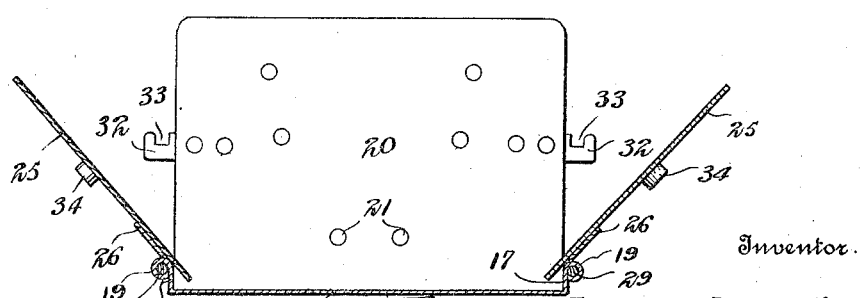
Fig. 5 is a transverse sectional view taken on the line 5—5 in Fig. 1, showing the sides of the pan moved to a partly open position.

The bottom member 15 of the improved pan consists of a rectangular plate of sheet metal provided at the end and side edges thereof with upstanding lugs 16, 17 formed with terminal coils 18, 19. At each side edge two such upstanding lugs having terminal coils have been shown, while at each end edge a single such lug is deemed sufficient.

The end members of the pan consist of rectangular plates 20 of sheet metal, each end member having secured to its outer face, by means of rivets 21 which are countersunk in the inner face of the end member to form a smooth finish, a hinge member 22 having coils or eyes 23 adapted to lie adjacent and in alinement with the coil 18 of the lug 16 at one end of the bottom member for the reception of a pintle 24 whereby the parts are hingedly connected together. It will be noticed that the hinge member 22 is positioned on the end member 20 in such a manner that the coils 23 will be spaced from the lower edge of the end member a distance equal to the height of the lug 16 carrying the coil 18, which latter is spaced above the plane of the bottom member 15. In like manner each side member 25 of the pan consists of a rectangular piece of sheet metal provided with hinge members 26 secured by rivets 27 which are countersunk in the inner face of the side member and having coils or eyes 28 adapted to receive pintles 29 that extend through the coils 19 of the upstanding lugs 17. The side and end members will thus be hingedly connected with the bottom member in such a fashion as to be capable of swinging outwardly with respect thereto, while the inward movement of the upper end portions of said side and end members will be limited by contact of the lower portions of said side and end members with the upstanding lugs 17, 16, respectively.

Each end member is provided with keepers 30 in which handles 31 are mounted for the convenient manipulation of the pan. Each end member is also provided with brackets 32 riveted thereon and projecting beyond the side edges thereof, said projecting side portions being provided with notches 33 for engagement with corresponding latch members 34 pivoted on said side members and having notched portions 35 projecting beyond the side edges thereof for interengagement with the notched bracket portions 33.

From the foregoing description it will be seen that the side and end members of the pan are hingedly connected with the bottom member and are adapted to swing and fold outwardly with respect thereto. When the side and end members are raised to a vertical position further movement of the upper portions thereof in an inward direction will be prevented by the upstanding lugs 16, 17, and the side and end members may now be connected by the interengaging latch members, as will be readily seen. A sufficiently tight baking pan or receptacle will thus be formed. After a loaf has been baked, the latch members may be disengaged, permitting the side and end members to swing outwardly when the lower portions of said side and end members, that is to say, the portions that extend below the axes of the pintles of the respective hinge members, will exert an upward pressure on the loaf which will thus become loosened so that it may be readily detached or removed from the pan. When the pan is collapsed by swinging the side and end members outwardly a large number of pans may be stacked on one another, thus enabling the pans to be stored in small compass.

Having thus described the invention, what is claimed as new, is:—

1. A baking pan comprising a bottom member provided at the sides and ends thereof with upstanding lugs having terminal coils disposed in spaced parallel relation to the body portion of the bottom member, side and end members having hinge members secured on the outer faces thereof and provided with terminal coils, said coils being spaced from and disposed in substantially parallel relation to the lower edges of the side and end members, and pintles connecting the terminal coils of the hinge members with the terminal coils of the upstanding lugs of the bottom member.

2. A baking pan comprising a bottom member provided at the sides and ends thereof with upstanding lugs having terminal coils disposed in spaced parallel relation to the body portion of the bottom member, side and end members having hinge members secured on the outer faces thereof and provided with terminal coils, said coils being spaced from and disposed in substantially parallel relation to the lower edges of the side and end members, and pintles connecting the terminal coils of the hinge members with the terminal coils of the upstanding lugs of the bottom member, said side and end members being provided with interengaging latch members whereby they may be secured in upstanding position with their lower end portions abutting on the inner faces of the upstanding lugs at the sides and ends of the bottom member.

3. In a baking pan, a bottom member having upstanding lugs at the sides and ends thereof, side and end members hingedly connected with said lugs adjacent to the upper edges thereof, said upstanding lugs engaging the lower portions of the outer faces of the side and end members to limit swinging movement of said side and end members in one direction, and interengaging latch members whereby the side and end members may be connected together to secure the same in an upstanding position.

In testimony whereof I affix my signature in presence of two witnesses.

FRANK F. LEWANDOWSKI.

Witnesses:
JOHN RADRIEJEWSKI,
FRANK V. KOLITS.

Copies of this patent may be obtained for five cents each, by addressing the "Commissioner of Patents, Washington, D. C."